Oct. 28, 1924.
O. KAY
OIL BURNER
Filed June 2, 1923
1,513,599
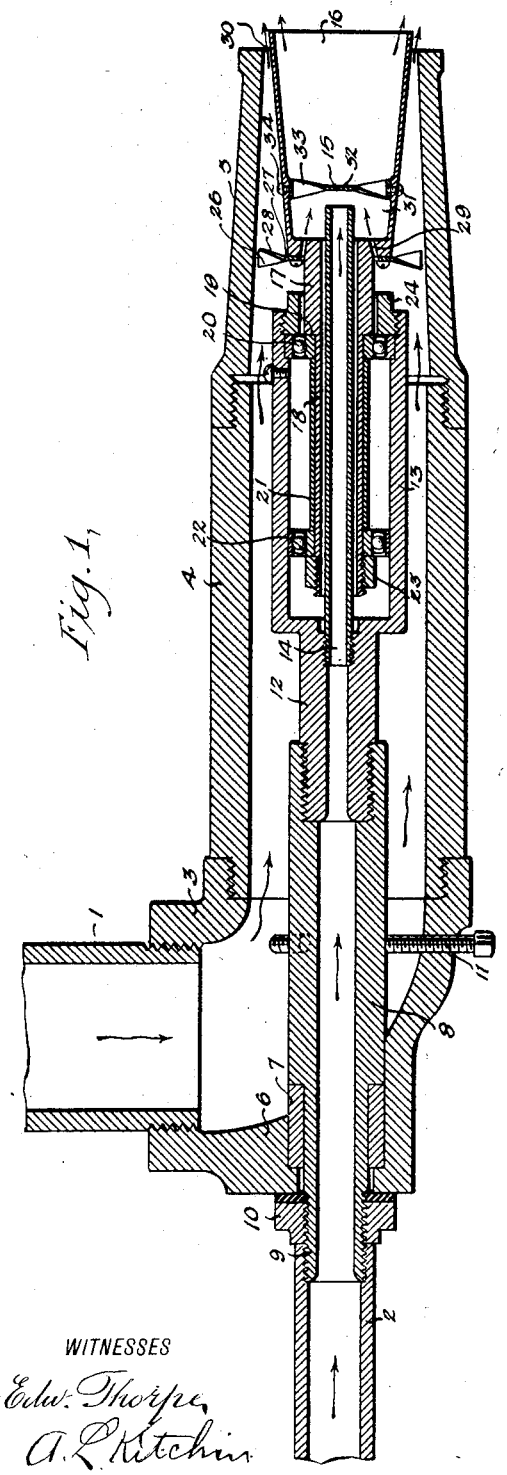
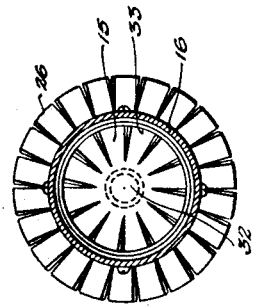
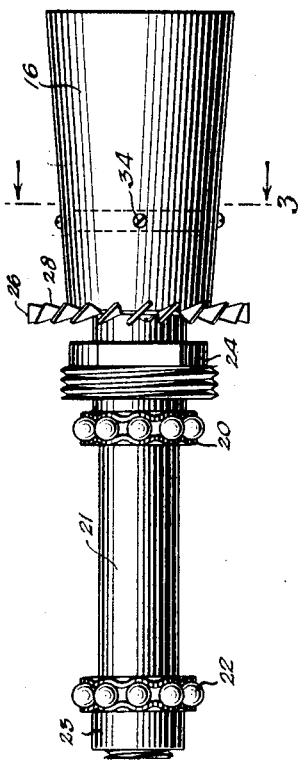
WITNESSES
Edw. Thorpe
A. L. Kitchin
INVENTOR
Oscar Kay
BY Munn & Co.
ATTORNEYS Patented Oct. 28, 1924.

1,513,599

UNITED STATES PATENT OFFICE.

OSCAR KAY, OF HOUSTON, TEXAS.

OIL BURNER.

Application filed June 2, 1923. Serial No. 643,046.

*To all whom it may concern:*

Be it known that I, OSCAR KAY, a citizen of the United States, and a resident of Houston, in the county of Harris and State of Texas, have invented a new and Improved Oil Burner, of which the following is a full, clear, and exact description.

This invention relates to oil burners and has for an object to provide a construction wherein the oil is broken up and emulsified to an appreciable extent before it is discharged.

Another object of the invention is to provide an oil burner in which oil is broken up or finely divided in the presence of air and is then discharged in a thin sheet.

A still further object of the invention is to provide an oil burner in which a mixing chamber and associated parts may rapidly rotate without becoming unduly heated.

In the accompanying drawing—

Figure 1 is a longitudinal vertical section through a burner, disclosing an embodiment of the invention.

Figure 2 is a side view of the distributing cone and associated parts.

Figure 3 is a sectional view through Figure 2, approximately on line 3—3.

Referring to the accompanying drawing by numerals, 1 indicates a pipe for supplying air under pressure and 2 a pipe for supplying oil under pressure. The pipe 1 is threaded into a fitting 3 which in turn carries a tubular section 4 on which a nozzle 5 is screwed. The fitting 3 is preferably enlarged at 6 for receiving a bearing sleeve 7 carrying an inner tube 8 which is provided with a threaded extension 9 for accommodating the clamping nut 10 on which the end of pipe 2 is screwed. If desired, a number of centering set screws 11 may be used for properly centering and supporting the pipe 8. Threaded onto the pipe 8 is a tubular member 12 merging into a large portion or casing 13. An oil distributing pipe 14 is threaded into the tubular member 12 and extends to near a mixing device 15 hereinafter fully described. Associated with the casing 13 is a distributing cone 16 which may be integral with or rigidly secured to the tubular section 17, which section is formed with a reduced portion 18 whereby a shoulder 19 is presented against which the bearing structure 20 is placed. A spacing sleeve 21 surrounds section 18 and against this spacing sleeve a second bearing structure 22 is placed and finally a clamping nut 23. The tubular section 17 with the portion 18 is provided with a bore sufficiently large to permit these members to freely turn without contacting with the distributing pipe 14.

A nut 24 is threaded into the end of casing 13 and prevents the bearing 20 from moving outwardly and, consequently, prevents the various parts from leaving the casing 13. As indicated in Figure 1, the nut 24 crowds the bearing 20 against a shoulder formed in the casing 13 so that the parts are locked in proper place while the cone 16 and associated parts may freely rotate with the bearings therefor placed an appreciable distance from the flame. It will be noted that the casing 13 and associated parts do not fill the section 4 and, consequently, an ample supply of air may pass from the pipe 1 around these parts and strike the propeller 26, after rotating the propeller which is rigidly secured by screws or other means to the cone 17 moving on out through the discharge end of the nozzle 5 where it mixes with the fuel being discharged from the interior of the cone.

The propeller 26 is of special construction and is preferably made from a piece of sheet metal stamped so that there will be a solid ring 27 and a plurality of propeller blades 28 arranged at a desired angle. Adjacent the juncture of the cone 16 with the tubular member 17, is arranged preferably a plurality of passage-ways 29 whereby air will not only pass out of the discharge opening 30 but will pass through the apertures 29 into the mixing chamber 31 and eventually out of the distributing cone 16 from the interior thereof. The oil is discharged from the pipe 14 against a solid central section 32 of the fan 15 which is a mixing and an emulsifying device. This fan is made of sheet metal preferably and provided with a solid center 32 and a plurality of propelling blades 33, some of which are bent over at the upper end so as to receive the retaining screws 34 whereby the device is held firmly in the cone 16. The blades 33 not only act as propelling blades for assisting the propeller 26 in rotating the parts but act to emulsify the oil and thoroughly mix the same with the air passing into the mixing chamber through the passage-ways 29. As the oil is discharged against the central solid section 32, it will be deflected back into the main part of the chamber 31 and, consequently, will have a preliminary mixing with the air entering through the passageways 29. This preliminary mixed air and oil will then be thoroughly mixed and the oil more or less finely divided as it is forced past the blades 33. As the parts are rotating rapidly, this mixture of air and oil will have a tendency to move radially outwardly and, consequently, will cling to the inner wall of the cone 16 until it passes from the cone whereupon it mixes with the air passing out of the discharge opening 30.

What I claim is:—

1. An oil burner, comprising a tubular head having a discharge nozzle, a pipe for supplying air to said head, an atomizing frustoconical deflector projecting from the end of said nozzle, a pipe for supplying fuel oil to said head, said last mentioned pipe extending through the inner end of said deflector centrally thereof, and an emulsifying device arranged in said deflector and positioned in the path of movement of the oil from said pipe, said emulsifying device having a solid section directly in front of said pipe whereby oil from said pipe must move radially before passing said emulsifying device, and a fan secured to said deflector exteriorly thereof positioned to engage the air passing from said air pipe through said nozzle whereby the deflector is rotated.

2. In an oil burner of the character described, a rotatable frustoconical deflector open at one end and provided with perforations at the opposite end whereby air may enter said opposite end, a propelling member connected with the deflector exteriorly thereof, and a stirring and emulsifying member connected to the deflector interiorly thereof, said stirring member having a solid center arranged centrally of the deflector, said deflector having an oil inlet at the center whereby the oil will strike the solid center of said stirring member immediately after it enters said deflector.

3. In an oil burner of the character described, an atomizing frustoconical deflector and an emulsifying device mounted in said deflector, said emulsifying device being formed with a solid center, an outer rim and connecting blades, and fastening means extending through said outer rim and the deflector for securing the emulsifying device in position.

OSCAR KAY.